(12) United States Patent
Dalton et al.

(10) Patent No.: US 11,687,822 B2
(45) Date of Patent: Jun. 27, 2023

(54) AUTOMATED FUNCTIONAL UNDERSTANDING AND OPTIMIZATION OF HUMAN/MACHINE SYSTEMS

(71) Applicant: 1337666 ALBERTA LTD., Two Hills (CA)

(72) Inventors: Joseph Dalton, Calgary (CA); Will Bauer, Edmonton (CA); Lindsay Haag, Two Hills (CA)

(73) Assignee: METRIC MASTERS LTD., Two Hills (CA)

( * ) Notice: Subject to any disclaimer, the term of this patent is extended or adjusted under 35 U.S.C. 154(b) by 1118 days.

(21) Appl. No.: 15/649,395

(22) Filed: Jul. 13, 2017

(65) Prior Publication Data

US 2018/0018588 A1    Jan. 18, 2018

Related U.S. Application Data

(60) Provisional application No. 62/361,932, filed on Jul. 13, 2016.

(51) Int. Cl.
*G06N 20/00*    (2019.01)
*G06Q 10/067*   (2023.01)
*G06Q 30/04*    (2012.01)
*G06N 5/047*    (2023.01)

(52) U.S. Cl.
CPC ............ *G06N 20/00* (2019.01); *G06N 5/047* (2013.01); *G06Q 10/067* (2013.01); *G06Q 30/04* (2013.01)

(58) Field of Classification Search
CPC .......... G06N 5/04; G06N 20/00; G06N 5/043; G06N 7/005; G06N 99/005; G06N 5/047

USPC .......................................................... 706/11
See application file for complete search history.

(56) References Cited

U.S. PATENT DOCUMENTS 7,765,039 B1 *   7/2010  Hagenbuch ............. G06F 17/00
                                                340/436
2016/0187210 A1 *   6/2016  Coleman et al. ......... G01L 1/22

OTHER PUBLICATIONS

Liaw et al., "Time-Series Field Trip Data Analysis Using Adaptive Recognition Approach. Analysis on Driving Patterns and Vehicle Usage for Electric Vehicles," Proceedings of the 19th Electric Vehicle Symposium (EVS-19), Oct. 19-23, 2002, Busan, Korea. (Year: 2002).*
Liao et al., "Anomaly Detection in GPS Data Based on Visual Analytics," IEEE Symposium on Visual Analytics Science and Technology, Oct. 24-29, 2010, Salt Lake City, Utah, USA (Year: 2010).*
Meiring et al., "A Review of Intelligent Driving Style Analysis Systems and Related Artificial Intelligence Algorithms," Sensors 2015, 15, 30653-30682, Dec. 4, 2015 (Year: 2015).*

(Continued)

*Primary Examiner* — Tsu-Chang Lee
(74) *Attorney, Agent, or Firm* — DLA Piper LLP (US)

(57) ABSTRACT

A method of analysing and tracking machine systems has the steps of sensing operational data from equipment, the operational data comprising at least location, time, and one or more operational condition data related to the equipment; analysing the operational data to identify data patterns; logging the data patterns as events in a database; comparing the events to a database of predetermined patterns to classify each data pattern as a known event or an unknown event; updating the database to include a new data pattern related to any unknown events; and alerting a user to further classify the unknown events manually.

30 Claims, 6 Drawing Sheets

(56) References Cited

OTHER PUBLICATIONS

Gindele et al., "Learning Context Sensitive Behavior Models from Observations for Predicting Traffic Situations," Proceedings of the 16th International IEEE Annual Conference on Intelligent Transportation Systems (ITSC2013), The Hauge, The Netherlands, Oct. 6-9, 2013 (Year: 2013).*
Galceran et al., "Multipolicy Decision-Making for Autonomous Driving via Changepoint-based Behavior Prediction," InRobotics: Science and Systems Jul. 13, 2015 (vol. 1, No. 2, p. 6) (Year: 2015).*
Pentland, Alex, and Liu, Andrew, "Modeling and Prediction of Human Behavior," Neural Computation 11,229-242 (1999) (Year: 1999).*
Chen et al., "D3: Abnormal Driving Behaviors Detection and Identification Using Smartphone Sensors," 12th Annual IEEE International Conference on Sensing, Communication, and Networking (SECON), 2015, pp. 524-532 (Year: 2015).*
Di Lecce et al., "A Distributed Measurement System for Smart Monitoring of Vehicle Activities," In 2010 IEEE Instrumentation & Measurement Technology Conference Proceedings (pp. 903-907). IEEE (Year: 2010).*
Di Lecce et al., "Multi Agent Negotiation for a Decision Support System in Route Planning," CIMCA 2008, pp. 458-463 (Year: 2008).*
Nguyen et al., "Fuel consumption estimation for kerbside municipal solid waste (MSW) collection activities," Waste Management & Research 2010: 28: 289-297 (Year: 2010).*
Sandhu et al., "In-use measurement of the activity, fuel use, and emissions of front-loader refuse trucks," Atmospheric Environment 92 (2014) 557-565 (Year: 2014).*
Ola M. Johansson, "The effect of dynamic scheduling and routing in a solid waste management system," Waste Management 26 (2006) 875-885 (Year: 2006).*

* cited by examiner

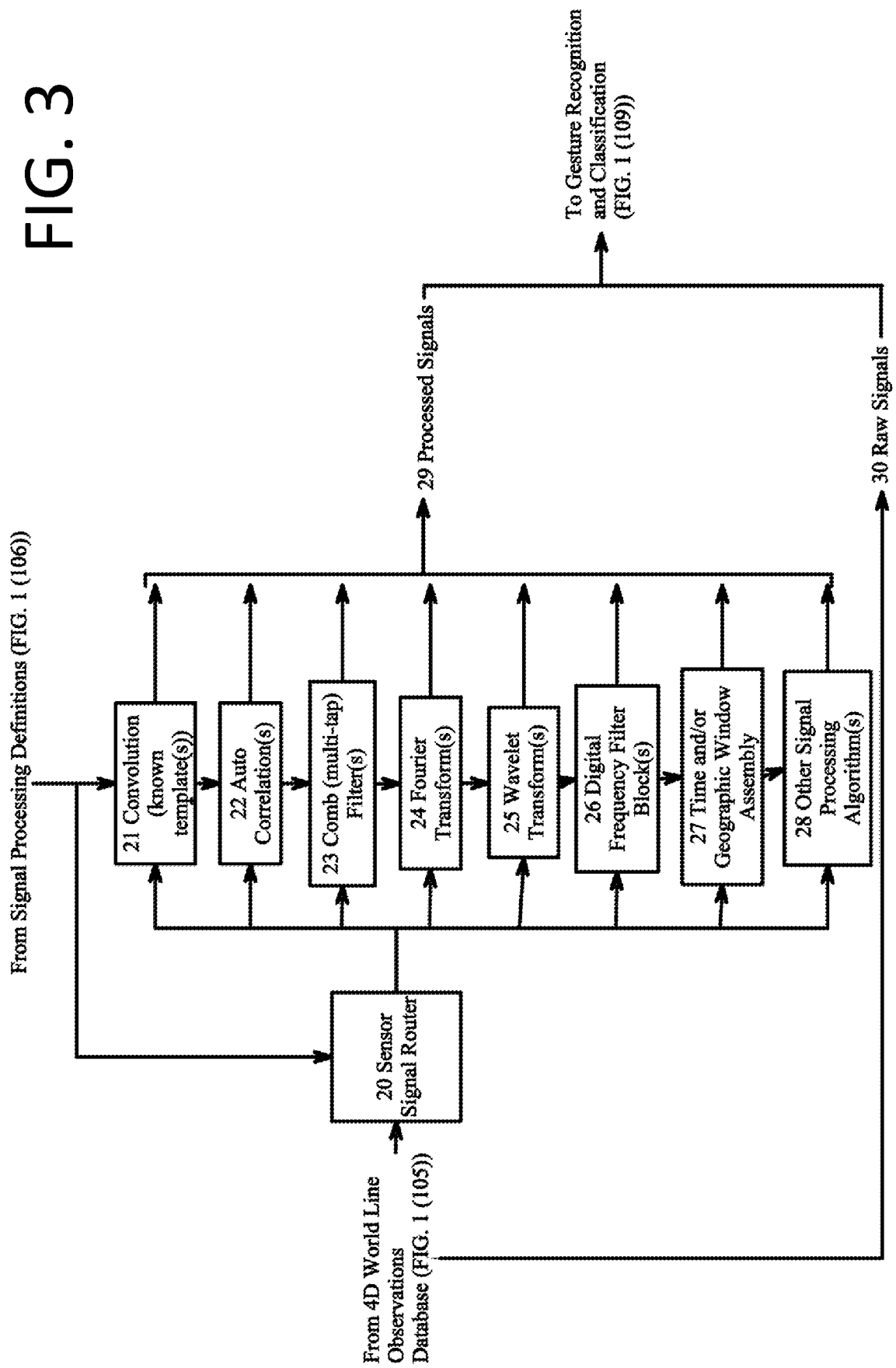

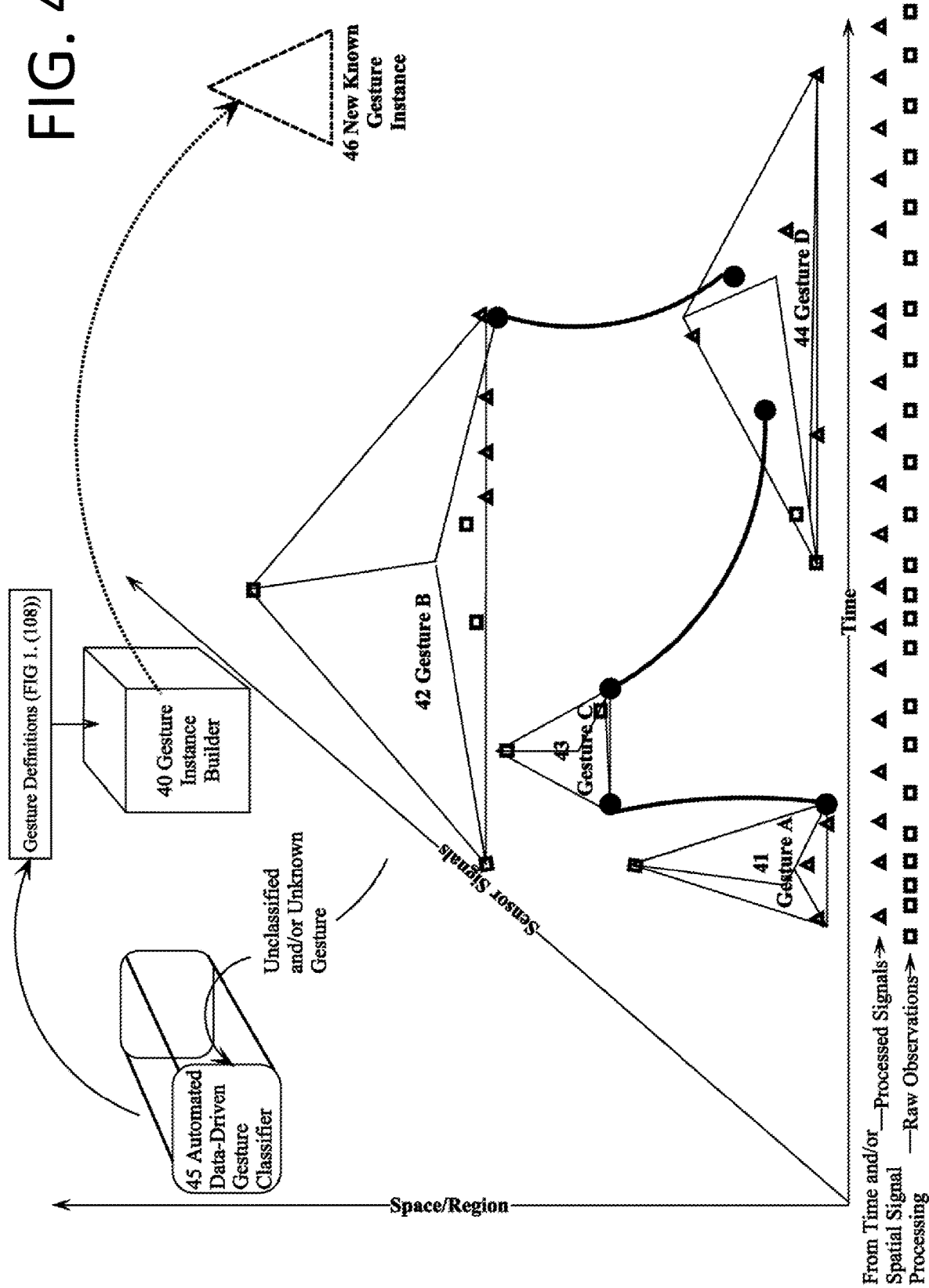

AUTOMATED FUNCTIONAL UNDERSTANDING AND OPTIMIZATION OF HUMAN/MACHINE SYSTEMS

FIELD

This relates to methods and systems for analysing and tracking entities operating as part of an organization or system involving both humans and machines.

BACKGROUND

In order to coordinate groups of humans, tools, machines, and resources "operations management practices" are used. These practices rely on decision making based on available information and relate to actions of benefit to a group of humans (e.g. a corporation, governmental group, non-profit society, religious sect, etc.). United States pregrant pub. no. 20040210371 (Adachi et al) entitled "Location confirmation method and location display system of construction machine and such construction machine" and United States pregrant pub. no. 20140310412 (Shinohara et al.) entitled "Management server for remote monitoring system" describe systems for tracking the operation and movement of industrial equipment.

SUMMARY

There is provided methods and systems for automatically sensing, abstracting, perceiving, and classifying the actions and identities of entities operating as part of an organization or system involving both humans and machines. The system automatically senses and classifies entity actions and, as well, partitions them into time/space regions in which they occur. Such information can be used to analyse and partition system activities, allowing identification and understanding of classified groups of actions and how they relate to organizational tactical and strategic goals. Based on this action/region partitioning, computer models for classes of entities within an organization may be developed, inferring causal rules for how each entity responds to changes in their sensed state. Based on such entity modelling, predictive simulations may be constructed to assess the probable effect of operational changes on the system as a whole. Based on such information, optimization of organizational functioning can be achieved. Optimization can be both local (e.g. based on, for example, a single, particular, entity) and global (optimization of an entire, coordinated network of system entities).

According to other aspects, there is provided methods and systems for automatically perceiving, analysing, and reporting on actions of one or more entities and/or associated entities within an organization comprised of humans and machinery, comprising: Geographic position and time measurement; At least one sensor detector; Electronic transduction to convert sensor signals and geography/time information into computer network transmissible form; A time/space-ordered database to record said time/space/sensor measurements; Computational device(s) to automatically abstract, recognize, and classify at least one set of actions from said database, thereby determining the time/space "Region" of extent of the actions; A "markup" database capable of storing such perceived actions and their metadata; Action analytics and reporting device(s) capable of determining facts about at least one entity, storing such facts in a database for future reference/comparison, analysing such facts with respect to previous historic facts and actions, generating exception alerts regarding significant deviations from either historic averages of actions or absolute thresholds, generating profit/loss/cost accounting summaries for at least one entity, and generating automatic billing information based on entity actions.

According to other aspects, there is provided methods and systems for automatically measuring, abstracting, analyzing, categorizing, and understanding—in real-time or near-real-time—actions (both in time and space) of organizational entities. Such automated, data-driven, perception of entity actions enables automatic summaries and time-motion productivity analysis of entity activities over arbitrary and non-continuous blocks of time and 3D space. It also allows such summaries to automatically adapt over time, changing in response to changes in the nature of the activities being monitored. As well, the same abstracted data can be used to automatically build computational models of organizational entities. These models that can be used for optimization purposes—either optimizing actions of the entity in question, or linking such models together with implicit data-defined inter-entity relationships to optimize groups of entities on an organization-wide basis.

According to other aspects, there is provided systems and methods that may be used to create a networked, geographically distributed, entity sensing network capable of real-time or near-real-time perception and analysis of the states and actions of many entities at once. For each entity, this consists of: acquiring real-time data from a multiplicity of sensors, amongst which are some allowing GPS geographic location measurement; storing such geo-location data in a time-ordered 4 dimensional (three spatial dimensions plus time) database of observations that effectively establish what in physics would be termed the entity's "world line"; pre-processing this data using signal processing techniques to increase signal-to-noise ratio and, as well, help recognize patterns within and between signals; analysing this world line data to recognize and classify multiple tiered levels of abstracted actions, or data structures, termed "Gestures", "Behaviours", "Activities", and "Accomplishments"; automatically linking such identified actions with particular "Regions" of space/time within which they occur; entering all such information into a "world line markup" database overlaying the entity's 4D world line; using this information in combination with raw observations to ascertain the entity's identity based on a "fingerprint" of its real-time actions; analysing the entity's marked up world line to tabulate statistics regarding the nature and duration of all perceived actions; generating operational summaries thereof, along with real-time exception events (deviations from absolute thresholds or historical averages), per entity profit/loss/cost accounting summaries; and performing automated billing based on entity actions.

According to other aspects, the systems and methods may utilize machine learning, pattern recognition, and other computational techniques to automatically and inductively infer/identify important variables and relationships based on comparison between "constellations" of current data with the ongoing historic dataset already acquired over days/weeks/months/years of operations. Such variables/relationships are extracted from historic data as it is acquired and are then used to formulate predictions and hypotheses about future states of the system. As the existence and predictive utility of such variables/relationships changes over time, this system and method perceives its environment, learns, and adapts, changing its models to accurately anticipate the future in real or near-real time, and allowing for optimizing of organizational behaviour accordingly.

According to other aspects, through automated real-time and near-real-time perception, analysis, categorization, and understanding of entity actions, the system enables multi-dimensional, operations-context/application-specific, optimization within an organization. It enables both sophisticated localized (single entity) optimization and, as well, global enterprise-wide optimization for specific high level goals such as profit, business growth, et al. It enables end-to-end, dynamic real-time or near-real-time, optimization of organizational functioning in terms of overarching goals such as profitability (per entity, or per group of entities), pickup/delivery efficiency, or business growth.

In other aspects, using the system, it is possible to observe single entity or grouped entity response in near-real or real-time as organizational changes are implemented, assessing the system's overall response to the changes implemented and comparing it with other experimental changes made in the past or predicted. Such systems/networks consist of one or more organizational entities traversing a "world" (i.e. the physical world and/or one or more virtual computer simulation(s)) in both time and space with the goal of performing optimal actions at many different locations, such locations changing over time.

According to other aspects, the systems and methods automatically and continuously sense entity state through a multi-dimensional array of sensed/measured variables in combination with a variety of contextual environmental variables. Data from each sensor are serialized and stored to form a series of 4D (3D plus time) "world line" measurements. Such world lines effectively arrange the sensor data in time/space, tracing out the movement of the entity through these 4 dimensions. As part of the action abstraction and perception process, "Constellations" of time-coherent world line measurements are built, copying and cross-linking relevant data from multiple sensors to form constellations of readings that all occurred within particular bounded temporal regions. Constellation members are chosen to reinforce one another to heighten their statistical certainty as indicators determining start/stop of useful events. Such world lines are stored in a special, temporally ordered, database.

In some aspects, based on the observational world line data flux from such sensing, the system scans the multi-dimensional data flow from each entity, automatically identifying operations-specific "Observations" encountered/generated by the entities. A combination of signal processing and machine learning algorithms examines this multi-dimensional data, identifying high probability transition points where activity shifted from one endeavour to another, and, as well, identifying when constellation values fall within "definitions" identifying and classifying particular actions. Such definitions can be either explicitly defined by human programmers, or automatically inferred through so-called "unsupervised" signal processing and/or data discretization techniques known to one skilled in the art. The system then links these Observations to time-based geographic locations, abstracts other, higher level events by using data fusion techniques to analyse temporally adjacent lower level or same level event combinations, links sequences/patterns of events into time-based "gestures", associates gesture sequences/patterns into "Behaviours", automatically determines 4D world line "Regions" of geographic/temporal extent within which such Behaviours occur, and automatically overlays the world line of each entity's physical/temporal trajectory with a series of segmented Regions extending through time and space ("auto-segmentation"). The system then integrates the totality of such automatic abstractions to identify, measure, and tally completion of "Activities" of interest that are further combined/abstracted to form "Accomplishments" that form the granular bedrock of tactical and strategic operational goals.

According to some aspects, the automatically machine-perceived information as discussed above may be used to multi-dimensionally optimize performance, allowing the system to automatically perceive and adjust (or be adjusted by human operators) to variations in both the physical world and entities' states over time so as to optimize the efficiency and profitability of the system/network. Such optimizations can happen automatically, or in a human assisted, interactive fashion, adaptively optimizing system/network behaviour.

According to some aspects, the block functionality of such system comprises: acquiring data from a variety of real-time and near-real-time sensors and, if necessary, pre-processing it using local "embedded" computing resources; transmitting that multi-sensor data to a multi-appliance computing platform (generally cloud based) that performs additional computing/storage tasks; serializing the data flow so as to ensure proper temporal ordering of individual sensor data; constructing time-stamped 4D "world line" data streams for each sensor that are stored in, for example, a NoSQL database; cross-linking said world line data to create "constellations" of intertwined world line data that combine multiple sensor measurements in ways useful to determining event start/stop boundaries and associated measurements; abstracting "Observation" features through analysis of constellation variables using one or more layers of computational processing and optionally storing said abstracted features into one or more separate database(s); abstracting "Gestures" from such streams of temporal events, recognizing them as repeating patterns of Observations and other Gestures extending over time and space; combining time sequenced sets of Gestures to recognize "Behaviours" as time/space patterns of Observations, Gestures, and other Behaviours; recognizing "Activities" as time/space patterns of Observations, Gestures, Behaviours, and other Activities; and recognizing "Accomplishments" as time/space patterns of Observations, Gestures, Behaviours, Activities, and other Accomplishments; automatically measuring and associating these Gestures, Behaviours, Activities, and Accomplishments with Regions of time/space extent; entering all such information into a "world line markup" database overlaying the entity's 4D world line; using this information in combination with raw world line Observations to ascertain the entity's identity (and that of its human operator, an "associated entity") based on a "fingerprint" of its real-time actions in comparison with prior history; further processing said features, creating record entries in an database of entity facts; using such information to analyse and report on entity performance in terms of operational summaries tabulating Gestures, Behaviours, Activities, Accomplishments and metrics surrounding their execution, exception events (deviations beyond either absolute thresholds and/or historic performance averages of certain tasks), profit/loss/cost accounting tabulations; and automatically generating billings based on entity actions; to feed the combined entity world line observations, action/region markup, and measured analytic facts to a Historic Modelling software module that uses such data to infer causal relationships between variables and create a software model of the entity and how it responds to changing variables over time.

According to some aspects, the method and apparatus discussed herein includes a properly integrated combination of the following elements:

a) "Geographically Indifferent Data Acquisition" whereby real-time or near-real-time measurements from each entity's sensors are acquired, locally pre-processed or conditioned/scaled, and transmitted over a wired or wireless electronic computer-based network to a special purpose database server or server network.

b) "Serialization and World Line Creation" whereby the incoming raw data is time-ordered, and inserted into a custom structured database containing sensor readings accessible via the 3 spatial dimensions plus time, such a database being meant to function both as a "big data" repository for analysis of contemporaneous data, and, as well, a historic "memory" of past activities.

c) "Time and/or Spatial Signal Processing" whereby sensor data streams, either alone or in combined constellations are processed using signal processing techniques meant to extract information regarding the structure of the data flow such as, for example, periodicity, frequency spectra, self-similarity, wavelet basis set composition, et al. Such processing may be performed upon time domain and/or spatial domain (concerning geographic 3D location(s)) data as appropriate. Additionally, such streams may be mapped from non-temporally adjacent windows of time to form new composite data streams containing multiple data streams time-offset and/or space-offset from one another.

d) "Gesture, Behaviour, Activity, and Achievement Recognition and Classification", or types of data structures, wherein both raw and time/space processed sensor signals are analyzed and compared to extant definitions of both actions and geographic spatial regions to identify recognizable action patterns of aggregate raw and abstracted variables, and identify when/where each action starts/stops in both time and space. Analysis further recognizes/classifies them (if known) by type, and, if unknown, automatically develops definitions for them, tags them as new unique types, and flags them for metadata entry by human operators. As the data structures progress from gesture through to activities and beyond, the type of data structure may be considered to fall within a hierarchical order from the lowest order, such as data patterns, to higher order data structures.

e) "World Line Time/Space/Region Auto-Segmentation" wherein entity world lines are automatically segmented to create a world line markup database that overlays each entity's world line with identified actions and the 4D (space plus time) regions in which said actions occur.

f) "Action-Based Analytics, Reporting, and Billing" in which the segmented 4D world lines of entities are analyzed, summarized, and compared with historic performance of the same, different, or aggregate-averaged entities' performance. Said analysis produces operations summaries and comparisons, exception events (where actions are problematic and/or deviate significantly from historic practice), and profit/loss/cost accounting summaries on a per entity basis that can also be aggregated across either groups of entities or an entire organization. Further, the evidence-based reporting of automatically detected and measured actions can be used to create automated billings based on actual events that occurred, not contractual generalities, enabling near-real-time evaluation of individual entity profit/loss/cost and response to changing entity or system conditions over time.

According to some aspects, the system may include one or more of the following features:

A system that stores sensor data linked to 4D (time plus 3 spatial dimensions) world line locations, uses such time/space positioning to analyse sensor signals, abstract patterns from them that identify actions, recognize, perceive, and classify multiple tiered levels of actions and relationships between them;

Automatic detection and classification of entity actions, and measurement of their Regions of extent over both time and space;

Automatic derivation of the metadata structure of relationships between entity actions, resulting in a tiered perception of levels of actions—components that build on each other to allow perception of larger, more comprehensive, activities and accomplishments;

Automatic identification of potential cause/effect relationships within said metadata structure of relationships;

Automatic analysis and reporting on entity actions to establish per entity profit/loss/cost profiles;

Automatic reporting of exception events regarding automatically detected deviations from normal historic averages for either the entity per se or aggregate averages across a truck fleet, different drivers, etc.;

Automatic analysis and reporting across entities to establish automatically calculated and continuously updated aggregate and entity-type-specific normative averages and variances for one or more groups of similar entities;

Use of continuously updated normative figures to create a continuously adaptive method of perceiving and identifying outlier actions based on deviations from norms that change over time (essentially a way of auto-thresholding detection of actions of note);

Ability to automatically adapt reporting of exception and/or outlier events over time based on deviations from continuously updated normative averages and variances;

Automatic analysis of, and continuous updating of, per entity and cross entity efficiency measurements;

Custom Gesture/Behaviour/Activity/Accomplishment variable windowing of data flows based on definitions that are either a priori from humans, or derived by machine learning pattern analysis (i.e. the specific Gesture detection techniques described);

Jointly/Severally doing signal processing of sensor signals based on any combination of time plus 3 spatial dimensions plus the sensor values themselves;

Signal processing Time and/or Geographic Window Assembly subsystem functionality for compositing signals of known time or geographic offset;

Identifying each entity action by a particular "fingerprint" of sensor data flux over particular regions of time and space. Transitions between these can be automatically recognized using machine learning data discretization techniques. This allows for a dual automated recognition of transition boundaries followed by automated derivation/definition of indicators for identifying the particular action (based on the data flux "fingerprint" interior to the start/stop transitions);

Tiered abstraction and perception/recognition of successive levels of actions, each built upon a combination of raw Observations and previously perceived/recognized, lower level or current level actions, such perception/recognition being based on multi-dimensional matching of either human-defined or machine-generated action definitions (e.g. Gestures);

Identify and classify both entities and "associated entities" automatically through machine learning techniques examining their sensor data fluxes, perceived actions, and time/space relationships between said actions. Each entity such as (in a preferred embodiment) a truck has a particular "fingerprint". This fingerprint is affected by the associated entity (e.g. the driver of a truck). Transitions between these can be recognized using machine learning data discretization techniques. Having segmented such transitions, the body of each separate entities data flux can then be analysed for maximum likelihood indicators that then can be automatically set as definitions to identify an entity's and/or their associated entity's presence during particular time periods.

Overall entity performance analysis may be based on cyclical temporal analysis and/or signal processing techniques to identify patterns in the performance data set and deviations from historic norms.

Overall entity performance analysis may be based on machine learning algorithm approaches similar to those already detailed for entity action recognition/classification, allowing automatic segmenting/classification of entity performance, development of maximum likelihood estimators to identify each classification type, and analysis/establishment of cause/effect relationships between variables. This automatic elucidation of the structure of each entity's performance and creation of cause/effect understanding of the causes of such structure is a significant advance over present day organizational analysis capabilities.

Use of machine learning and other techniques to automatically detect and elucidate the structure of actions of entities and/or associated entities in the system. This applies not only to the actions, but the relations between the actions.

Automatic detection of performance deviations from historic functioning

Automated action-based billing

Assessment of performance response to a known recipe of operations changes

According to an aspect, there is provided a method of analysing and tracking machine systems, comprising the steps of: sensing operational data from equipment, the operational data comprising at least location, time, and one or more operational condition data related to the equipment; analysing the operational data to identify data patterns; logging the data patterns in a database; identifying one or more gestures by comparing the data patterns to a set of gesture definitions; and identifying one or more behaviours in a set of behaviour definitions, each behaviour definition comprising a gesture and one or more of: one or more additional gesture, one or more operational datum, or combination thereof.

In other aspects, the method described above may further comprise the following aspects, alone or in combination: the method may further comprise the step of monitoring for unknown gestures or unknown behaviours, and automatically adding a definition of the unknown gestures or unknown behaviours to the respective set of gesture definitions or set of behaviour definitions; a user may be alerted to classify unknown gestures or unknown behaviours; the method may further comprise the steps of monitoring for unclassified gestures and unclassified behaviours based on repeated patterns, and adding the unclassified gestures and unclassified behaviours to the respective set of gesture definitions and set of behaviour definitions; the method may further comprise the step of comparing at least the operational data to one or more thresholds, and triggering an alarm if one or more thresholds have been exceeded; analysing the operational data to identify data patterns may comprise comparing data values from the sensors to values in the definitions, convolving signals representative of the operational data processing signals representative of the operational data, using machine learning techniques to segment the operational data, or combinations thereof; the signals may be processed to obtain spatial information, frequency information, time domain information, or combinations thereof from the processed signals; data patterns may comprise first order data structures, gestures comprise second order data structures, and behaviours comprise third order data structures, and the method may further comprise the step of identifying one or more higher order structure defined by sets of higher order definitions, each higher order structure comprising a combination of two or more lower order data structures, wherein at least one lower order data structure comprises an immediately lower order data structure; an operational analysis may be generated based on the data structures, which may comprise an efficiency analysis of the duration of each data structure, and the time between data structures; the operational analysis may further comprise an estimated cost of each accomplishment or activity based on one or more maintenance costs, material costs, labour costs, and equipment cost, and/or a comparison between separate equipment, separate operators, or both separate equipment and separate operators; the operational analysis may comprise a comparison of the estimated costs and benefits of modified operations relative to the estimated costs and benefits of current operations; the method may further comprise the step of logging each of the one or more gestures and one or more behaviours in the database.

According to an aspect, there is provided a system for analysing and tracking machine systems, comprising sensors mounted to equipment in the machine system, and a processor in communication with the sensors. The sensors sense operational data from the equipment comprising at least location, time, and one or more operational condition data related to the equipment. The processor is programmed to: identify data structures using sets of data structure definitions, the data structures being ordered hierarchically in one of a first order and more than one higher order, wherein the first order data structures comprise data patterns identified from the operational data, and higher order data structures comprise an immediately lower order data structure in combination with one or more lower order data structures.

In other aspects, the system described above may further comprise the following aspects, alone or in combination: the system may further comprise a notification device, and the processor may be further programmed to identify potential data structures, and trigger the notification device to notify a user of any potential data structures; the processor may be further programmed to compare the operational data or one or more data structures to one or more thresholds, and to trigger the notification device if one or more thresholds have been exceeded; comparing the data patterns to the database may comprise comparing data values from the sensors with values in a database, convolving signals representative of the operational data with another signal, processing signals representative of the operational data, applying machine learning techniques to segment the operational data, or combinations thereof; the signals may be processed to obtain spatial information, frequency information, time domain information, or combinations thereof.

According to another aspect, there is provided a method of analysing and tracking machine systems, comprising the steps of: sensing operational data from equipment, the operational data comprising at least location, time, and one or more operational condition data related to the equipment; and identifying data structures using sets of data structure definitions, the data structures being ordered hierarchically, wherein the first order data structures comprise data patterns identified from the operational data, and higher order data structures comprises a combination of two or more lower order data structures, wherein at least one lower order data structure comprises an immediately lower order data structure.

In other aspects, the method described above may further comprise the following aspects, alone or in combination: the method may further comprise the steps of monitoring for unknown data structures not in the sets of data structures and adding a definition of one or more unknown data structures to the sets of data structure definitions or alerting a user to classify the unknown data structures; identifying data patterns may comprise comparing data values from the sensors to values in the definitions, convolving signals representative of the operational data with another signal, or processing signals representative of the operational data, applying machine learning techniques to segment the operational data, or combinations thereof; the signals may be processed to obtain spatial information, frequency information, time domain information, or combinations thereof from the processed signals; the method may further comprise the step of generating an operational analysis based on a plurality of identified data structures; the operational analysis may comprise an efficiency analysis of the duration of one or more data structures, and a time interval between selected data structures; the operational analysis may further comprise an estimated cost of one or more data structures based on one or more maintenance costs, material costs, labour costs, and equipment costs; the operational analysis may comprise a comparison between separate equipment, separate operators, or both separate equipment and separate operators; the operational analysis may comprise a comparison of the estimated costs and benefits of modified operations relative to the estimated costs and benefits of current operations; the method may further comprise the step of logging each of the identified data structures in a database.

These and other aspects will be apparent from the specification, drawings and claims contained herein. The various aspects may be combined in any reasonable manner as recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 3 is a block diagram of a Time and/or Spatial Signal Processing subsystem, showing examples of typical types of signal processing that may be applied to signals by the system.

FIG. 4 is a diagram of the Gesture Recognition and Classification subsystems, setting out examples of gestural recognition as being based on perceiving/matching shapes in a multi-dimensional space consisting of time, three spatial dimensions ("Region" extent) plus particular "constellations" of signals assembled from raw Observations, time/spatially processed signals, and previously recognized Gestures.

DETAILED DESCRIPTION

There is provided a system for automatically sensing, abstracting, perceiving, classifying, analyzing, and reporting regarding the actions of appropriately instrument-equipped organizational entities in real-time and/or near-real-time.

Geographically Indifferent Data Acquisition

Figure 1A:
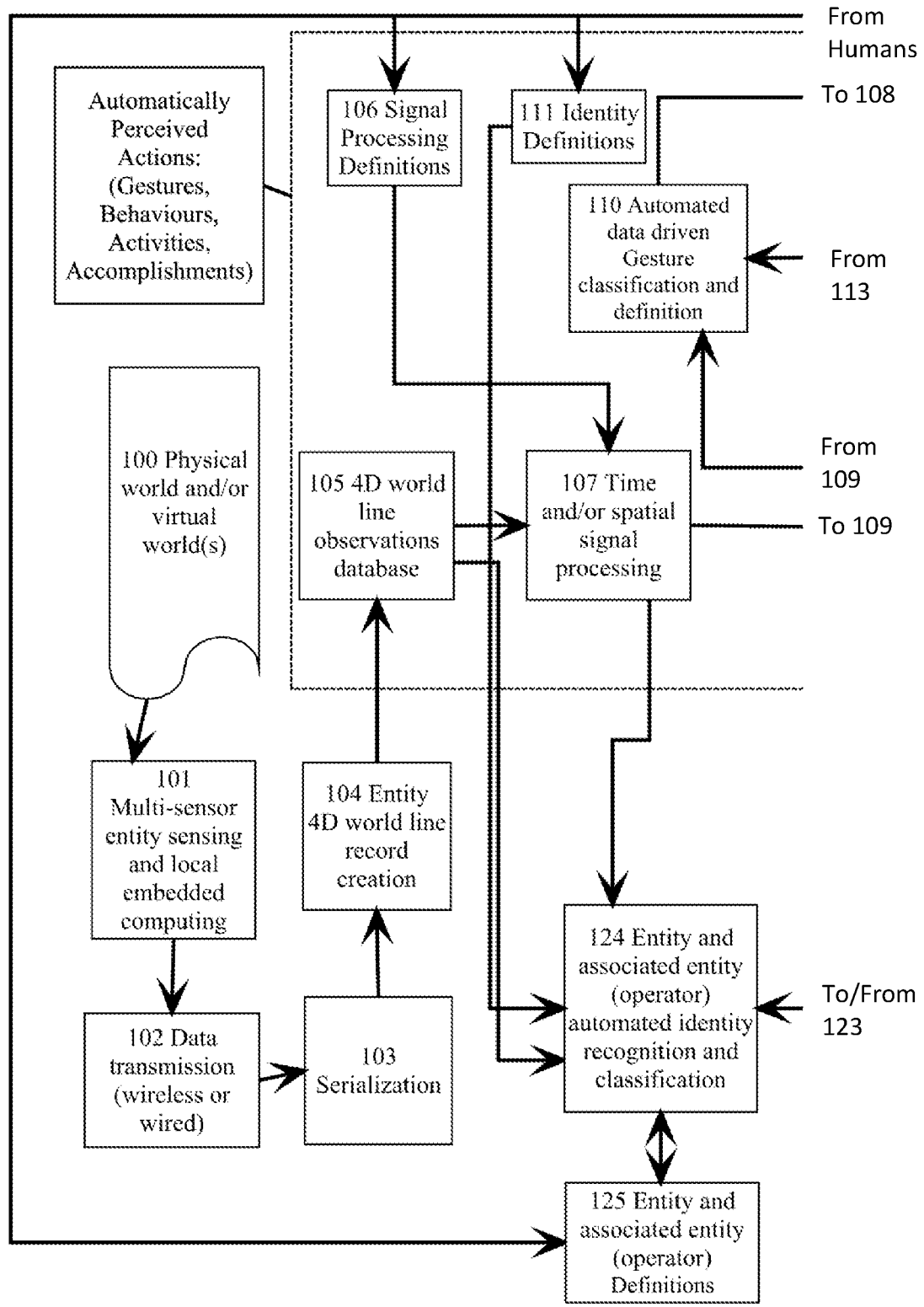
FIG. 1a-1c is a block diagram of a systemic design for a Single Entity Perception System, showing how the system may work in sensing, abstracting, perceiving, classifying, analysing, and reporting a single entity's actions.
Figure 1B:
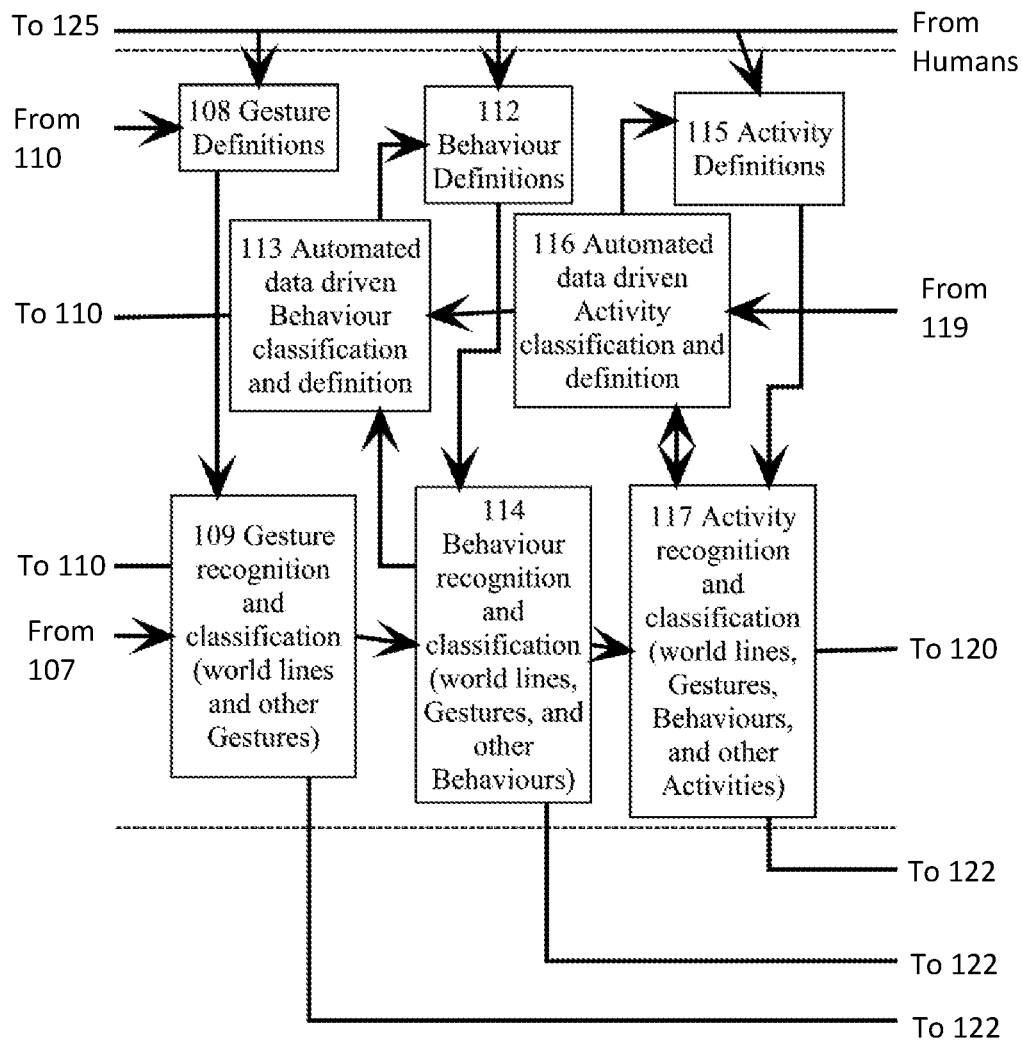
Figure 1C:
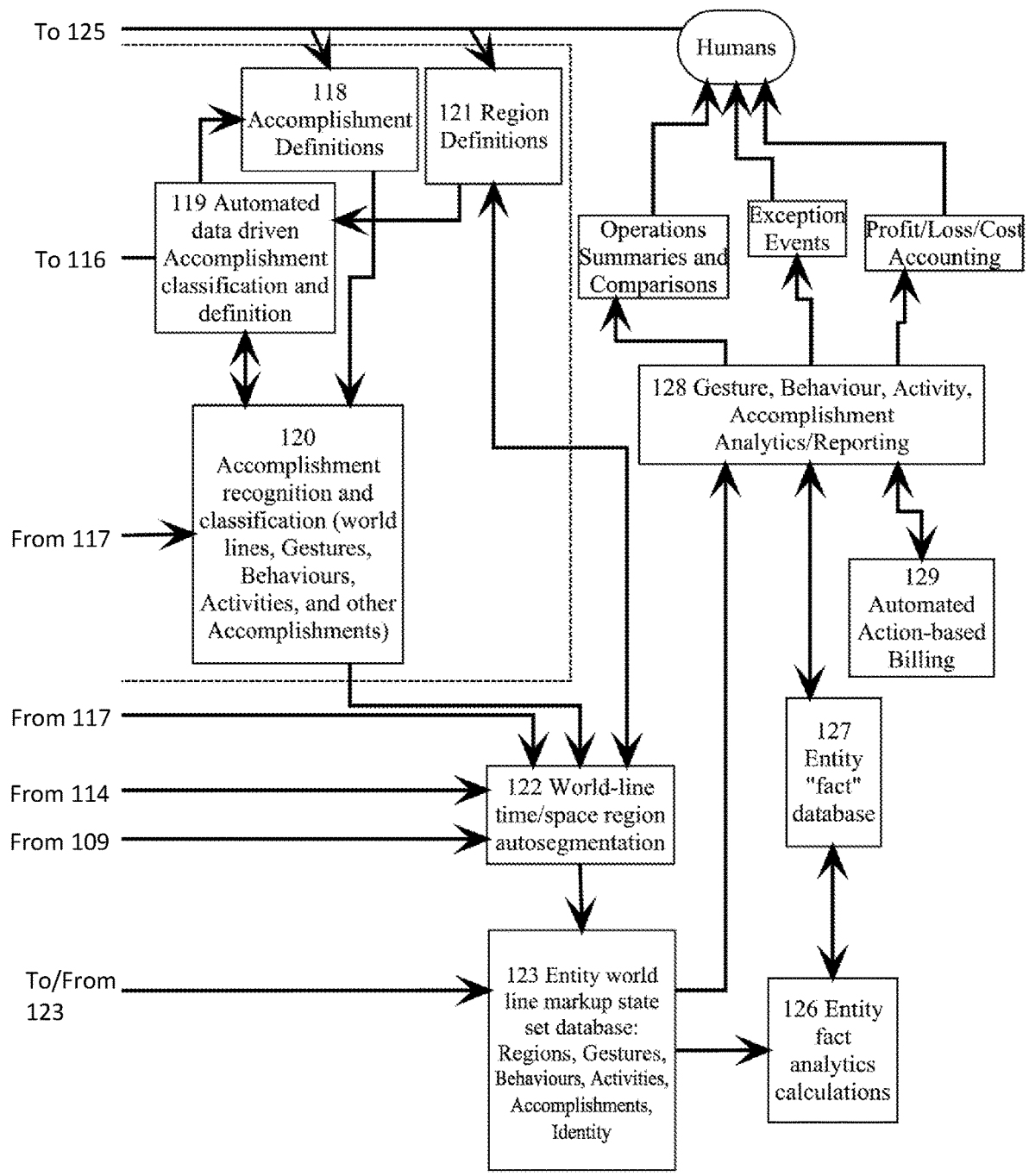
Figure 2:
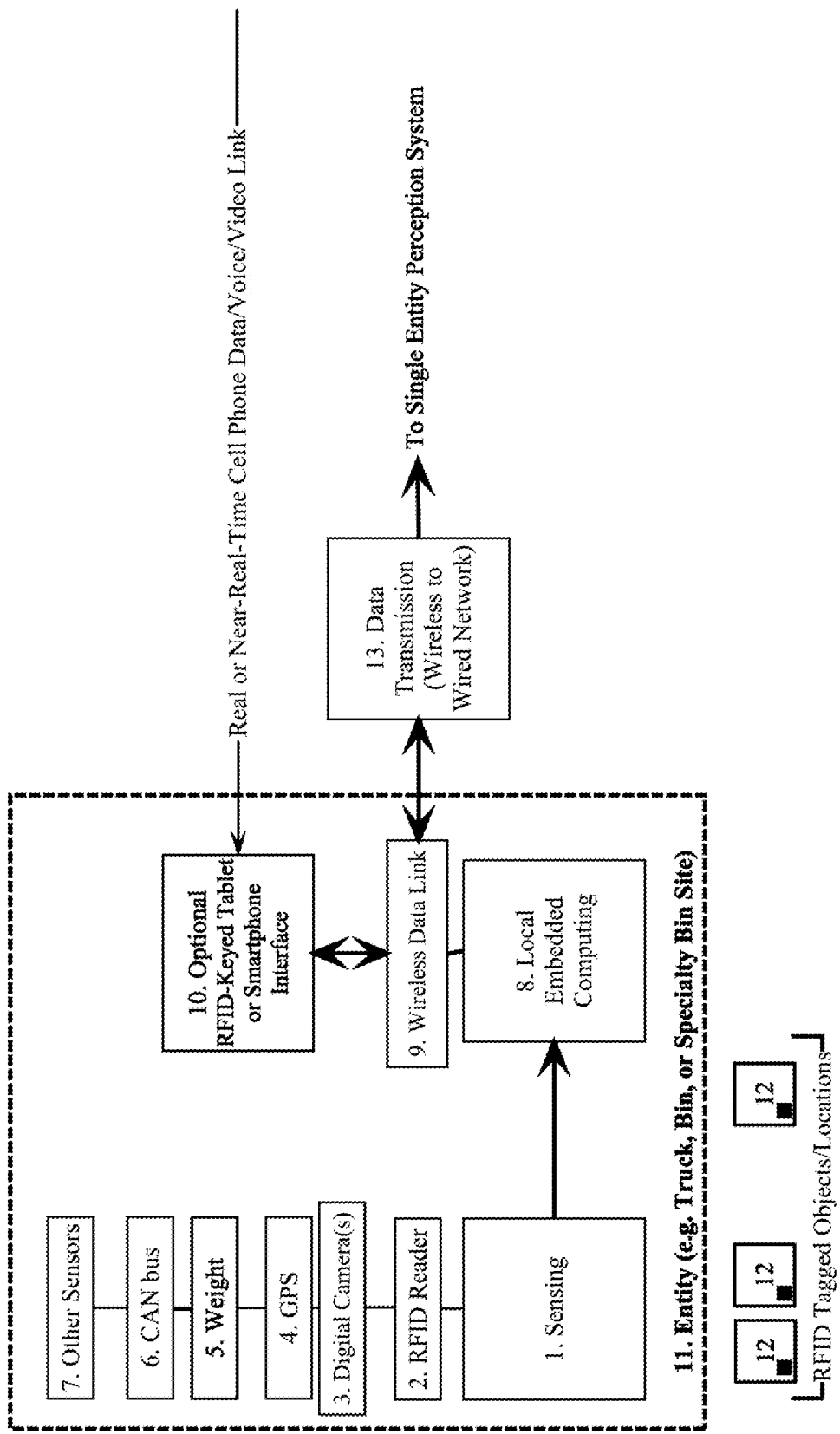
FIG. 2 is a block diagram of a Multi-Sensor Entity Sensing and Local Embedded Computing subsystem, showing the nature of some typical entity sensing for an example where the organization using the system is a waste hauling operation.

Referring to FIG. 1a-1c, the depicted system, generally indicated by reference numerals 101 to 129, includes electronic sensors and localized pre-processing computing contained in Multi-Sensor Entity Sensing and Local Embedded Computing block (101), which sense characteristics from the physical world and/or one or more virtual (data simulated/modeled) worlds (100) and convert them into time-stamped, electronically mediated, measurements (data) of the same. FIG. 2 shows a block diagram of a typical preferred embodiment of sensing and computing block (101) in which an entity (11) is a waste hauling truck, bin, or specialty bin site for the waste industry. These may include a general sensor block (1) in communication with a local processing block (8) and communication block (9). Sensor data may then be transmitted through a network (13) to a central computer processor/database, or displayed on a display unit (10), which may also transmit data all or selected data. Sensors may include one or more: RFID reader (2) that communicates with RFID tagged objects or locations (12), digital camera (3), GPS (4), weight or load sensor (5), CAN bus (6), etc. Notwithstanding the specific sensors articulated in FIG. 2, it will be clear to one skilled in the art that additional sensors (7), capable of sensing dangerous chemicals, density, the type of and volume/weight of specific materials in the waste stream, et al., may also be used, or other sensors required for application-specific needs that will be evident to one skilled in the art. Their diversity and capabilities will increase over time as sensor technologies progress.

Serialization and World Line Creation

Such measurements are conveyed via a Data Transmission block (102) to a Serialization block (103), where measurements from disparate sensors are properly sorted and time-ordered into the time sequence in which they occurred. FIG. 1 shows that certain definitions are user defined, as indicated by the block "humans" providing input to various blocks.

These, now properly time-ordered separate sensor data streams are then fed to Entity 4D World Line Record Creation block (104). Here they are ordered into data set records that specifically associate the entity's 4D location in time and space (3 spatial dimensions plus time) with the measurement taken. Geographic 3D position information comes from specific position determining sensors such as for example, a GPS receiver module. The term "world line" is used in this document in the sense of a physics "world line" i.e. the trajectory that an object takes simultaneously through 4 dimensional time and space. The world line of each entity is tracked by the system and (later) marked up with perception annotations that characterize "Regions" (of time and space) along the world line associated with identified/classified actions that occurred within said Regions.

These records are then stored into a 4D World Line Observations Database (105) in a form allowing the time/space location links to be associated, stored, and retrieved with each sensor observation. In a preferred embodiment, a "NoSQL" database such as MongoDB may be used to enable construction of particular "tree" and "forest" data structures of related measurements and higher level abstracted/perceived observation-based information, but other database types are possible and evident to one skilled in the art.

Time and/or Spatial Signal Processing

The system's preferred architecture is a real-time one commonly known as "data flow". Incoming data records are stored into the database for later reference, but are subsequently immediately pulled and processed by Gesture Recognition and Classification block (109), passing through Time and/or Spatial Signal Processing block (107) in the process. These two processing subsystems (107 and 109) are complimentary. FIG. 3 shows a typical structure of Spatial Signal Processing block (107). Measurements flowing from the 4D World Line Observations Database (FIG. 1, (105)) are routed by a Sensor Signal Router (20) to the appropriate signal processing block(s), both routing and processing parameters being determined from the Signal Processing Definitions block (106) of FIG. 1. Based on these settings, sensor specific signal analysis is provided, generating an array of additional Processed Signal (29) information from various blocks representing various operations, such as convolutions (21), auto-correlations (22), comb or multi-tap filters (23), Fourier Transforms (24) wavelet transforms (25), digital frequency filters (26), time and/or geographic window assembly (27), and/or other signal processing algorithms (28). This Processed Signal (29) and Raw Signal (30) information is made available to the Gesture Recognition and Classification subsystem (109) shown in FIG. 1 and subsequent subsystems, where it is used in addition to the raw observational data to make determinations regarding the nature of perceived entity actions.

The method and system may be useful to process such signals in more than one dimension. Since the data being fed into the signal processing is both time based and spatially based, it is possible and intended that the nature of processing may include—jointly and severally—any/all combination(s) of the 3 spatial dimensions plus time, plus the sensor readings themselves.

The specific signal processing blocks depicted in FIG. 3 are exemplary only. Depending on the nature of the entity and the actions being perceived by the system, other signal processing methods/algorithms/techniques may be used and will be evident in context to one skilled in the art.

The method or system may also be used to provide the ability to deal with the reality that time-based measurements are continuously flowing. Analysis, pattern recognition, and entity feature identification/perception based on such continuous flows is different from, for example, machine vision analysis of a single photograph, wherein all data relevant to the features being perceived is certain to be contained. We refer to this as the "Picture Windowing Problem".

For example, in one embodiment, signal processing subsystem Time and/or Geographic Window Assembly (27) may be used. This subsystem composites sensor readings into non-time-continuous windows, effectively creating a data stream consisting of several different "tap points" in time and/or space, offset to one another. In cases where known delay relationships between signals have been established, this composite data flow is much easier to analyse and will inherently highlight associated inter-signal relationships. Since the world line is inherently a 4 dimensional space, said compositing and setting of tap points may occur across any/all of the 3 spatial dimensions and/or time.

Data Structure Recognition and Classification

Once they have passed through the signal processing subsystem, world line sensor data is fed to Gesture Recognition and Classification block (109). It is here that further processing of the sensor signals occurs. FIG. 4 shows a conceptual view of this subsystem.

Each entity action, such as for example (in a preferred embodiment), a waste truck bin lift, has a particular time/space data flux "fingerprint". Transitions between these can be recognized using machine learning data discretization techniques. Having segmented such transitions, the body of data between transitions can then be analysed for maximum likelihood indicators that then can be automatically set as definitions of such actions.

For simplicity, in FIG. 4, the 3 spatial dimensions are compressed onto a single axis labelled "Space/Region", but it should be understood that this single axis actually represents 3 separate spatial axes of dimensional state space. The other part of this method and system's solution to the Picture Windowing Problem is found herein. For example, a Gesture Instance Builder subsystem (40) may work with Gesture Definitions block (108) to create particular software object instances tuned specifically to look for particular gestures. Conceptually, these objects are somewhat like immune system cells—they search through the stream of time, space, and multiple sensor data readings, looking to match particular patterns of sensor signals, 3D spatial positions, temporal positions, and 4D time/space/signal values of previously recognized Gestures. When a definition match is found, a recognized gesture is linked with the matching sensor values and time/space data into a data tree structure using World Line Time/Space Region Auto-Segmentation block (122) of FIG. 1. In FIG. 4, this is represented by Gesture A (41), Gesture B (42), Gesture C (43), and Gesture D (44), each of which includes certain datapoints as part of a recognizable pattern, which may be made up of raw data, processed data, or a combination of both. As part of its content, such a structure identifies and defines the "Region" of time/space extent occupied by the Gesture. Recognized Gestures are also given a classification type, such a type being useful in understanding the nature of entity actions occurring and tabulating reporting regarding the aggregate of many actions of the same or similar/related type. Such typing may be explicitly defined as part of the Gesture's definition. However, it may also be the case that, while a definition exists for a uniquely classified/typed Gesture, its type name and/or the type's relation to other known types is not presently known. Such a case may, for example, arise when an automatically generated Gesture definition is matched. In such a case, unless the system's human operators have explicitly entered a type classification and specific type relationship metadata to modify the automatic definition, all the automated system knows is that this is a uniquely recognizable Gesture, different from other Gestures (see below). Such un-typed Gestures may be flagged by the system in New Known Gesture block (46) for human operators to intervene and use their knowledge of the context of operations surrounding the gesture to define its type and provide additional type metadata that allows this Gesture to henceforth be correctly named and tabulated into reporting summaries using the type and the type metadata defining the type's relationship to other types.

The Gesture's structure is also published to be available for assisting in recognition of other gestures and, as well, is stored in a database using Entity World Line Markup State Set Database block (122) shown in FIG. 1.

This database contains a description of the "State Set" of an entity as it traverses its 4D time/space world line. The world line markup indicates the perceived/recognized actions performed by the entity, and the Regions of time/space over which they occurred. As such it can be analysed to generate analytic summaries of its records, allowing creation of summaries of what types of actions happened, the extent of time and space over which they happened, and, as well, metadata regarding the relationships between perceived/recognized actions of varying levels of abstraction. Such analysis is performed by Entity Fact Analytics (127) and Gesture, Behaviour, Activity, Accomplishment Analytics/Reporting block (128), and is discussed later in more detail.

Such "gesture trees" create a de facto custom window into the multi-dimensional data, and allow for the creation of other windows around their state space location that can be used by any other gesture instance recognizer to effectively centre its window onto the previously recognized gesture. In this way, the individual "gesture trees" may engender other recognized gestures, eventually forming a sort of "gesture forest" data set representing recognized gestures within the multi-dimensional state space.

It may be the case—especially initially—that the system does not recognize any Gestures. In this case, the unclassified/unrecognized flux of sensor and time/space data is fed to Automated Data-Driven Gesture Classification and Definition block (45) shown in FIG. 4. This subsystem examines the data flux, attempting to identify points at which actions change, signalling a transition from one action to another, different one. The nature of such classification algorithms have been the subject of so-called "machine learning" research, the outcome of which has been a variety of techniques for what is sometimes termed "data discretization"—effectively detecting transition points between one data context and another. When concerning temporal data, such techniques divide into two main categories—"supervised" (where the nature/context of such transitions is understood a priori) and "unsupervised" (where there is no real context to assist in identifying transitions). Such techniques are known to one skilled in the art, and a variety of them may be employed as part of an embodiment. Examples of some possible techniques are contained in the paper "Discretization of Temporal Data: A Survey" by P. Chaudhari, R. G. Mehta, N. J. Mistry, and M. M. Raghuwanshi, but others, equally or more applicable, will be evident to one skilled in the art. Application of such techniques identifies transition points, where it is probable that the post-transition action occurring is different from what was occurring immediately previous to the transition. These, in turn, allow analysis of the two different data fluxes (pre and post transition) to determine maximum likelihood indicators for identifying future actions of a similar nature and, as well, for uniquely identifying the action by way of a particular "fingerprint" of time/space related data values from multiple sensors. This, in turn, gives rise to automated creation of a Gesture definition template for identifying future occurrences of this Gesture and classifying them into the same Gesture type category.

The method and system may be used to provision tiered perception and recognition of successively higher level abstractions of actions based on multi-dimensional recognition of either human-defined or machine-generated action definitions (e.g. Gestures). Thus the method and system, as described, allows fundamental Observations to be abstracted to perceive Gestures; Gestures plus Observations to be combined to abstract and perceive/recognize higher level "Behaviours"; Behaviours plus Gestures plus Observations to be abstracted to perceive/recognize yet higher level "Activities"; and Activities plus Behaviours plus Gestures plus Observations to be combined to abstract/perceive/recognize yet higher level "Achievements". While 5 levels of abstraction are articulated in this description, there is no reason that such a process of abstraction—based as it is upon a combination of all raw Observations plus all previously perceived lower level and current level actions—cannot extend to yet higher levels. Generalization of such a process to higher levels will be obvious to one skilled in the art.

Given this tiering of perception/recognition, the functioning of the successive levels of perception/recognition is similar to that of the first level Gestures with respect to: perception/recognition algorithms (109), definitions (108), and automated data-driven classification and automated definition (110) for the higher level abstractions, or higher order data structures—Behaviours, Activities, and Accomplishments. The only difference is that, for each successive level of abstracted perception, more information is available to inform classification/perception/recognition choices, as all previously perceived/recognized lower or current level actions are available in addition to the raw Observation data itself. Once the utility of successive levels of abstraction is appreciated in conjunction with the lower level approach to action-centric "windowing" of data and matching of definitions, creation of higher levels or orders of data structures should be evident to one skilled in the art. Thus the FIG. 1 blocks (112) through (120) inclusive, which include a definitions database (112, 115, 118), an Automated data driven classification and definition block (113, 116, 119), and a recognition and classification block (114, 117, 120) do not need further description.

World Line Time/Space/Region Auto-Segmentation

"Regions" of extent in time and space may be identified within which actions occur. As an example, Region Definitions block (121) in FIG. 1 is a repository of definitions of such regions. Regions can be created explicitly by human operators and entered into this repository. In a preferred embodiment applied to a waste hauling company, human operators might, for example, define regions of interest such as a truck depot yard, land fill, or large area client site as Regions for which knowledge of entity presence/absence was desirable. These explicit definitions would be stored internally as object classes, with their geographic extent defined, but with an undefined time extent. When this definition was matched up using World Line Time/Space Region Auto-Segmentation block (122), a specific instance variable of that Region would be created with the time extent filled in. This would then be attached to the action presently being perceived, and stored as part of the entity's world line markup information in Entity World Line Markup State Set Database (123).

The method and system is preferably able to identify and classify both entities and "associated entities" automatically through their sensor data fluxes, perceived actions, and time/space relationships between said actions. An associated entity is an additional entity that is connected in some manner with another one. For example, in a preferred embodiment applied to a waste hauling organization, a truck could be an entity, and the truck's driver would be an associated entity connected to the truck for some temporal period.

Such identification/recognition of an entity, such as a truck and an associated person driving the truck, may be accomplished using so-called machine learning techniques in a manner similar to that described with respect to Automated Data-Driven Gesture Classification and Definition. As with entity action perception/recognition/classification in the identity recognition and classification block (124), each entity such as (in a preferred embodiment) a truck has a particular "fingerprint" of sensor data, system perceived actions, and metadata surrounding relations between actions, which may be defined or stored in identity definitions block (111). Transitions between entities and/or associated entities (such as, for example, a truck's driver) can be recognized using machine learning data discretization techniques. Having segmented such transitions, the body of data between them can then be analysed for maximum likelihood indicators that can act as definitions of such entities' presence during particular temporal time periods. Such definitions are stored in Entity and Associated Entity (Operator) Definitions (125). Thus activity of particular entities and associated entities can be automatically recognized repeatedly by the system. Human operators of the system can edit these definitions, adding in metadata such as names, truck VIN numbers, etc. to provide more specific contextual identification. Once this metadata has been added, it can be stored as a more complete identity element of the Entity World Line Markup State Set Database (123), where it can be made available to the Entity fact analytics calculations (126), Entity Fact Database (127), Gesture, Behaviour, Activity, and Accomplishment Analytics/Reporting block (128) used in compiling analytics and reporting information.

Action-Based Analytics, Reporting, and Billing

The nature of the analytics provided can satisfy multiple organizational assessment, optimization, and strategy goals. The Entity World Line Markup State Set Database (123) contains automatically perceived information about the actions performed by the entity over time. At a very basic level, such information allows construction of a "fact" database that tallies common figure of merit performance statistics over useful periods of time such as per day, per week, month, year, etc. In a preferred embodiment applied to a waste hauling organization, these might be, for example, daily/weekly/monthly facts about how many waste bins were emptied, what the average bin lift time was, how much truck idling existed, how much fuel was consumed over the 3D terrain path driven, or as perception events occurring in the course of a day, week, month, or year.

Beyond such basic operations summary performance tallies, however, more sophisticated analysis leading to real-time or near-real-time optimization can also be performed:

Cyclical temporal analysis may be performed to detect and understand both normal action levels and deviations therefrom. Actions can be aggregated over multiple continuous time periods such as days/weeks/months, etc. They can also be examined over specifically non-continuous segments, such as looking at all Mondays compared to all Thursdays, summer compared to winter, etc. As well, they can be aggregated geographically before such temporal analysis, for example being grouped regarding specific geographic regions identified by the system.

Such time/space aggregations of action data can then be analysed in terms of frequency distribution, statistical measures such as standard deviation that measure the variance of actions of the same or similar nature, cause/effect relationships regarding modulation of duration of actions, or other analytic analysis evident to one skilled in the art. These summaries may be compared with historic averages over the same time intervals, thereby establishing statistical variances of these measures over multiple time cycles. Such comparisons and variance measures may then be further analyzed to identify and flag statistically significant deviations for human investigation/optimization/remedy.

Analysis may also be non-temporal, using frequency analysis, auto-correlation, wavelet transforms, and/or other signal processing techniques similar to those detailed in FIG. 3. Time and/or Spatial Signal Processing to detect performance patterns.

As well, such overall entity performance analysis may be based on machine learning algorithm approaches similar to those already detailed for entity action recognition/classification, allowing automatic segmenting/classification of entity performance, development of maximum likelihood estimators to identify each classification type, and analysis/establishment of cause/effect relationships between variables. This automatic elucidation of the structure of each entity's performance and creation of cause/effect understanding of the causes of such structure is a significant advance over present day organizational analysis capabilities.

Automatic Detection of Performance Deviations from Historic Functioning

Taken together, these multiple analysis types enable significant management optimization opportunities: Firstly, they enable generation of "Exception Events" in real-time or near-real-time, where it is clear that something unusual has happened to the entity out of the realm of normally expected daily occurrence. A simply example of these events, in a preferred embodiment applied to a waste hauling organization, would be if a truck suddenly became idle for more than a certain period of time. Such inaction would be perceived by the system, identified as a "truck idle" exception event, and reported immediately to dispatch operators. Secondly, more subtle deviations could also be perceived, allowing one to assess the slow changing of an entity's performance functionality over time and/or in response to operational changes implemented. For example, in a preferred waste hauling embodiment, a truck's power take off ("PTO") unit, sensed via truck CAN bus data fluxes, might slowly degrade in terms of power delivery over time due to equipment wear. This could cause a lengthening of the lift time of so-called "Roll Off" waste bins onto the back of the truck, which would be noted in performance metrics. Such a performance degradation could be identified and measured, then correlated with the CAN bus PTO data by the system's machine learning segmentation techniques to establish a probable causal relationship between the two, which could, in turn, be identified to human operators.

Assessment of Separate Categories of Actions and Derivation of Overall Per Entity Efficiency When entity actions are classified by type, they can be tabulated by type over known periods of time and/or space. It is an aspect of an embodiment that such types can also be given "attributes" by human operators who understand the greater context of operations. Thus types of actions can be sorted and tabulated by attribute. For example, in a preferred embodiment where the system is applied to a waste hauling business, revenue-generating actions such as waste bin pick-ups from clients might be given a "productive time" attribute, whereas revenue-costing actions such as time spent at a landfill, time spent idle, etc. might be given an "unproductive time" attribute. Performance of an entity could be evaluated over a specific time period to examine its entity-specific ratio of productive to unproductive time, allowing generation of a measure of its efficiency. Such entity-specific efficiency figures could then be compared to cross-fleet averages to, for example, identify outlier entities whose performance needed human investigation and/or correction.

Assessment of Per Entity Profit/Loss/Cost

Related to such efficiency analysis, it is an additional aspect of an embodiment to enable per entity assessment of profit, loss, and cost and the correlation of these values with the entity state set information stored in the Entity Fact Database (127) and Entity World Line Markup State Set Database (123) to understand cause/effect relationships between the automatically perceived actions/regions and their profit/loss/cost outcomes. Based on such analysis, deep understanding of the incremental cost and profit/losses arising from adding/subtracting particular actions can be obtained, allowing optimization of chains of actions to maximize profitable outcomes. For example, in a preferred embodiment where the organization was a waste hauling company, it would be possible to assess the specific incremental "transition cost" of adding one customer's pick up to a particular route, measuring the incremental time taken to pick up, and separating out the incremental effect of this waste pickup on when a trip to dump at a landfill was needed. This sort of entity-specific, action-specific, client-specific, cost calculation is not presently possible. It is invaluable in determining cost/benefit, assessing pricing and opportunity cost for current or future clients, and for optimizing routing of trucks based not only on geography, but on the nature of what they have historically picked up from specific locations in terms of weight, volume, material, etc.

Aggregation of Multiple Entities into Groups of Similar Auto-Classified Type

While much of this discussion is focused upon automatic perception and measurement of actions per entity, it will be obvious to one skilled in the art that such entity measurements can be usefully combined, grouped, and aggregated. This is particularly the case given the method and system's ability to automatically classify types of actions, and for metadata regarding relationships between those actions to be either automatically generated by the system, or entered directly by humans familiar with action contexts who are able to define and name said action types and their relations to each other. Thus it is possible for the system to generate reporting that groups entities by type, and, further, analyses based on more sophisticated metadata such as causal relationships between types of actions, etc.

Comparison Across Multiple Entities with Varying Associated Entities, or Regarding a Single Associated Entity Over Time It should also be evident to one skilled in the art that it is possible to generate reporting that directly compares or ranks associated entities such as, for example, operators of vehicles. Since the method and system can classify—through the nature of, and relationships between, their actions—which human was operating the entity, it is possible to generate inter-human rankings of groups/teams of operators regarding their operation (at different times) of the same entity. Additionally, it is possible to generate similar inter-human rankings of operators and their operation of other entities of a similar type (for example, multiple trucks of the same model/type). As well, it is possible to assess performance of a single operator over time to measure skills improvement.

Comparison across Multiple Entities and/or Groups of Entities

It should also be evident to one skilled in the art that it is possible to aggregate and compare actions and automatically analysed/reported performance of multiple entities. This is particularly useful in comparing similar, or related, entities and examining potential cause/effect relationships for significant differences between them. For example, in a preferred embodiment applied to a waste hauling organization, it might be the case that truck engine wear for one set of trucks used in a particular geographic terrain was significantly worse than that of the same trucks used elsewhere. Similarly, waste bins could be assessed to establish causal factors with respect to their effective (non-chronological) age and repair status versus client, location, weight of materials, local rainfall levels, etc. Once established, such causal modelling could be used predictively to anticipate and/or mitigate entity maintenance activities/costs.

Automated Action-Based Billing

It is a further aspect of the system and method that it enables Automated action-based billing block (129) to generate customer charges based on specific, automatically perceived and tabulated, actual actions and achievements completed rather than broad contractual agreements. Using the system and method, it is possible to automatically perceived completed, billable, accomplishments and, in detail, determine the costs of the accomplishments. Such detailed reporting may be used to automatically generate billing, particularly "cost plus" billing that ensures a known profit margin per action.

For example, in a preferred embodiment such as application to a waste hauling organization, it would be possible to automatically tabulate—over an arbitrary billing period or even on a per event basis—the number of times a specific truck/driver had gone to a client's site and picked up a waste bin. It would further be possible, using the metadata attached to each system-perceived action, to base that accomplishment's billing on a very detailed number of action-related variables such as: the weight of material picked up by the truck each time; the incremental transit time and fuel consumption both from the truck's previous location to the pickup site and to a landfill for dumping; and the indirect cost of truck wear and tear for carrying such a weight of waste material.

Based on this specific, per event, information, costs can be determined. Billing can then be generated on a per event basis for this accomplishment, reflecting actual accomplishment costs plus a desired profit margin. Alternatively, billing can be based on simpler, but equally automatically perceived, accomplishments such as just lifting a bin at a particular site. However, in both cases, billing is generated only when the event actually happens and is not based on a contract that calls for emptying bins on a call-in basis, "on average every two weeks", etc.

Such evidence-based, action-based, billing is extremely powerful in terms of both strategic and tactical management of the organization. It confers ability to directly manage and optimize the organization on a per entity and per action profit/loss/cost basis. This capability is specifically enabled by the ability to automatically perceive, record, and aggregate detailed information about each action.

Automated Assessment of Performance Response to a Known Recipe of Operations Changes The system and method may also be used to enable automatic assessment of the effect of a known set of operational changes—both per entity, and with respect to groupings of entities. The significant per entity level of detail perceived by the system regarding entity actions allows performance metrics to be evaluated both before and after changes are made. Thus the system and method can analyse the response of the organization to changes, essentially treating it in a manner similar to an electronic filter and assessing its "impulse response" to a particular type of stimulation. Such response assessment can happen in near-real-time, waiting only on the individual time constants that may be associated with the specific recipe of changes implemented. It is important to note that such a response is not necessarily linear—either per entity or across all system-recognized entities or entity groups. Without the ability to automatically perceive and measure real-time, per entity, actions, and assess them against continuously changing historic norms, such response assessment would be impossible. It is the fineness of real-time-automated, per entity, time/space/action perception that makes such response assessment possible/viable.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A method of analyzing and tracking a plurality of waste hauling trucks in a geographic area, wherein each waste hauling truck of the plurality of waste hauling trucks includes a sensor mounted to peripheral equipment, the method comprising:
   receiving operational data from the peripheral equipment of each waste hauling truck in the plurality of waste hauling trucks via the sensor, the operational data includes:
      a location measured by a GPS receiver,
      a time, and
      sensor data related to operation of the peripheral equipment of each waste hauling truck;
   analyzing the operational data to identify a data pattern of the plurality of waste hauling trucks;
   storing the data pattern in a database;
   classifying the data pattern as a gesture based on a set of gesture definitions with a first machine learning technique;
   identifying a system behaviour based on a plurality of gestures, wherein the plurality of gestures includes the gesture, and wherein the system behaviour is identified with a second machine learning technique, wherein the second machine learning technique is different from the first machine learning technique; and
   generating a report, the report to associate the system behaviour of the plurality of waste hauling trucks to determine an efficiency of an aggregated operation of the plurality of waste hauling trucks across the geographic area,
   wherein analyzing the operational data to identify the data pattern comprises:
      comparing the operational data to values in the set of gesture definitions,
      processing raw signals representative of the operational data to generate processed signals, and
      further processing the processed signals to identify the data pattern.

2. The method of claim 1, further comprising monitoring for an unknown gesture and adding the unknown gesture to the set of gesture definitions.

3. The method of claim 2, further comprising alerting a user to classify the data pattern when the data pattern is unable to be classified in any gesture definition of the set of gesture definitions.

4. The method of claim 1, further comprising triggering an alarm if the sensor data exceeds a threshold value.

5. The method of claim 1, wherein the the processed signals include spatial information, frequency information, time domain information, or combinations thereof from the data pattern.

6. The method of claim 1, wherein the data pattern comprises first order data structures, the gesture comprises second order data structures, and the system behaviour comprises third order data structures, and further comprising identifying a higher order structure defined by sets of higher order definitions, each higher order structure comprising a combination of two or more lower order data structures, wherein at least one lower order data structure comprises an immediately lower order data structure.

7. The method of claim 6, further comprising generating an operational analysis based on the data structures.

8. The method of claim 7, wherein the operational analysis comprises an efficiency analysis of a duration of each data structure, and the time between data structures to determine the efficiency.

9. The method of claim 8, wherein the operational analysis further comprises an estimated cost of an accomplishment or an activity based on one or more of maintenance costs, material costs, labour costs, and equipment costs.

10. The method of claim 9, wherein the operational analysis comprises a comparison between separate equipment, separate operators, or both separate equipment and separate operators.

11. The method of claim 9, wherein the operational analysis comprises a comparison of estimated costs and benefits of modified operations relative to the estimated costs and benefits of current operations.

12. A system for analyzing and tracking a plurality of waste hauling trucks in a geographic area, the system comprising:
   sensors mounted to peripheral equipment in each waste hauling truck of the plurality of waste hauling trucks, the sensors sensing operational data from the peripheral equipment comprising:
      a location measured by a GPS receiver,
      a time, and
      one or more additional operational condition data related to operation of the peripheral equipment; and
   a processor in communication with the sensors of each waste hauling truck of the plurality of waste hauling trucks, the processor being programmed to:
      identify data structures using sets of data structure definitions, the data structures being ordered hierarchically in a first order data structure with a first machine learning technique and a second order data structure with a second machine learning technique, wherein the first order data structure comprises data patterns identified from the operational data, and the second order data structure comprises the first order data structure in combination with an additional first order data structures to determine an efficiency of an aggregated operation of the plurality of waste hauling trucks across the geographic area.

13. The system of claim 12, further comprising a notification device to notify a user of if one or more thresholds have been exceeded in the operational data.

14. The system of claim 12, further comprising comparing the data patterns to values in a database, processing raw signals representative of the operational data with another signal to generate processed signals, processing the processed signals representative of the operational data, applying machine learning techniques to segment the operational data, or combinations thereof.

15. The system of claim 14, wherein the processed signals include spatial information, frequency information, time domain information, or combinations thereof.

16. A method of analyzing and tracking a plurality of waste hauling trucks in a geographic area, wherein each waste hauling truck has peripheral equipment, the method comprising:
receiving operational data from the peripheral equipment of each waste hauling truck of the plurality of waste hauling trucks, the operational data comprising:
a location measured by a GPS receiver,
a time, and
sensor data related to operation of the peripheral equipment;
identifying a data pattern from the operational data of the plurality of waste hauling trucks;
identifying data structures from the data pattern using sets of data structure definitions, the data structures being ordered hierarchically, wherein first order data structures include the data pattern, and higher order data structures comprises a combination of two or more lower order data structures, wherein at least one lower order data structure comprises an immediately lower order data structure, and wherein a first machine learning technique is used to identify the first order data structures and a second machine learning technique is used to identify the higher order data structures to describe system behaviours; and
generating an operational analysis based on a plurality of identified data structures from the plurality of waste hauling trucks across the geographic area, wherein the operational analysis comprises an efficiency analysis of a duration of one or more data structures, and a time interval between selected data structures, and wherein the operational analysis further comprises an estimated cost of the one or more data structures based on one or more maintenance costs, material costs, labour costs, and equipment costs,
wherein analyzing the operational data to identify the data pattern comprises:
comparing the operational data to values in a set of gesture definitions,
processing raw signals representative of the operational data to generate processed signals,
processing the processed signals to identify the data pattern, and
using machine learning techniques to classify the data pattern as a gesture based on the set of gesture definitions, and
wherein the operational analysis is to optimize a routing of the plurality of waste hauling trucks within the geographic area.

17. The method of claim 16, wherein the raw signals are processed to obtain processed signals, wherein the processed signals include spatial information, frequency information, time domain information, or combinations thereof from the data pattern.

18. The method of claim 16, wherein the operational analysis comprises a comparison between separate equipment, separate operators, or both the separate equipment and the separate operators.

19. The method of claim 16, wherein the operational analysis comprises a comparison of estimated costs and benefits of modified operations relative to the estimated costs and benefits of current operations.

20. The method of claim 1, wherein the peripheral equipment is a bin lift.

21. The method of claim 20, wherein the sensor data is collected from a load sensor to measure a weight of a bin lifted by the bin lift.

22. The system of claim 12, wherein the peripheral equipment is a bin lift.

23. The system of claim 22, further comprising a load sensor to measure a weight of a bin lifted by the bin lift.

24. The method of claim 16, wherein the peripheral equipment is a bin lift.

25. The method of claim 24, wherein the sensor data is collected from a load sensor to measure a weight of a bin lifted by the bin lift.

26. The method of claim 1, further comprising optimizing a routing of each waste hauling truck of the plurality of waste hauling trucks based on the efficiency of the operation of the plurality of waste hauling trucks across the geographic area.

27. The system of claim 12, wherein the processor is programmed to optimize a routing of the waste hauling truck based on the efficiency of the operation of the plurality of waste hauling trucks across the geographic area.

28. The method of claim 5, wherein the processed signals are processed with one of convolutions, auto-correlations, comb or multi-tap filters, Fourier Transforms, wavelet transforms, digital frequency filters, time and geographic window assembly.

29. The method of claim 28, wherein the processed signals are processed with the raw signals with the second machine learning technique.

30. The method of claim 1, further comprising automatically generating a bill based on the report.

* * * * *